Oct. 14, 1952      E. J. DEMAS      2,613,927
WEIGHT DETERMINING APPARATUS
Filed Aug. 23, 1945      3 Sheets-Sheet 1
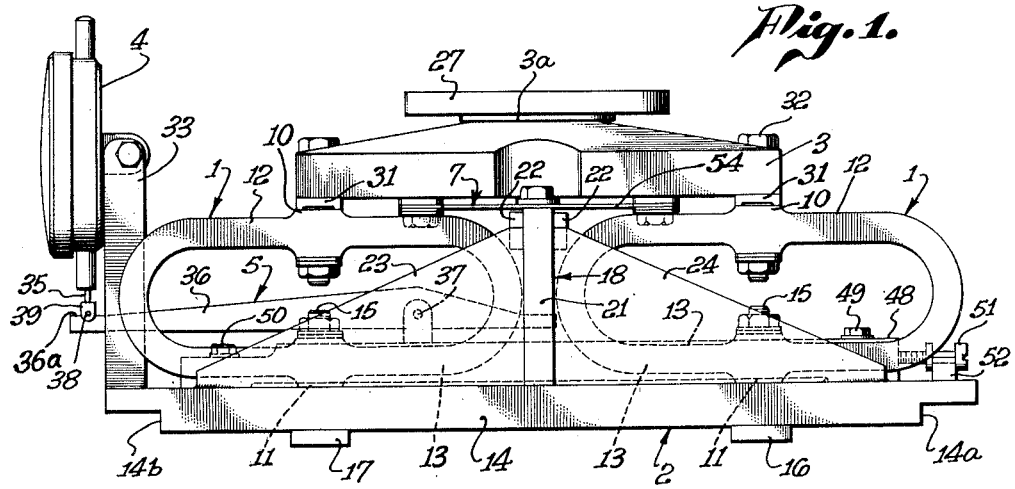
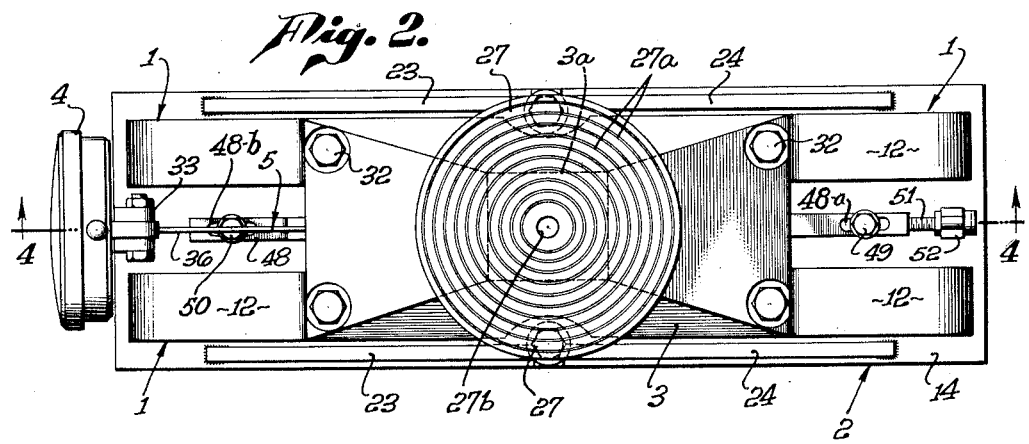
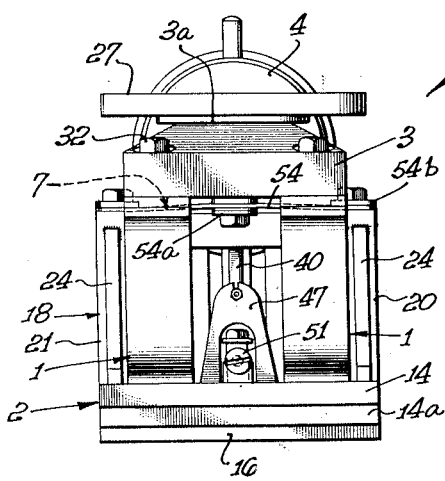
Epaminondas James Demas
INVENTOR.
BY    *C. R. Weilein*
ATTORNEY.

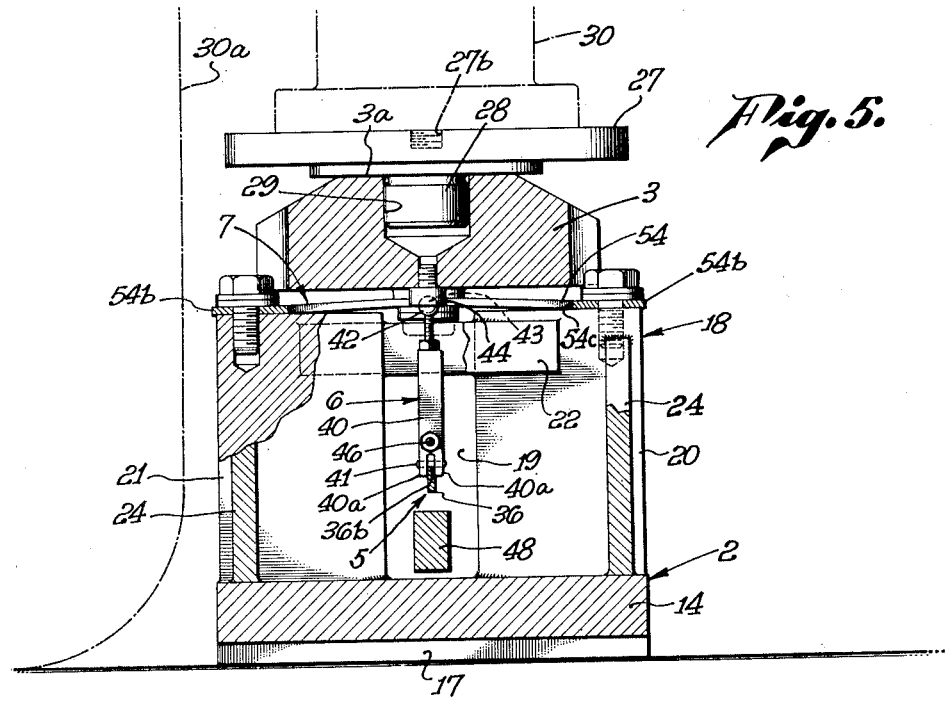
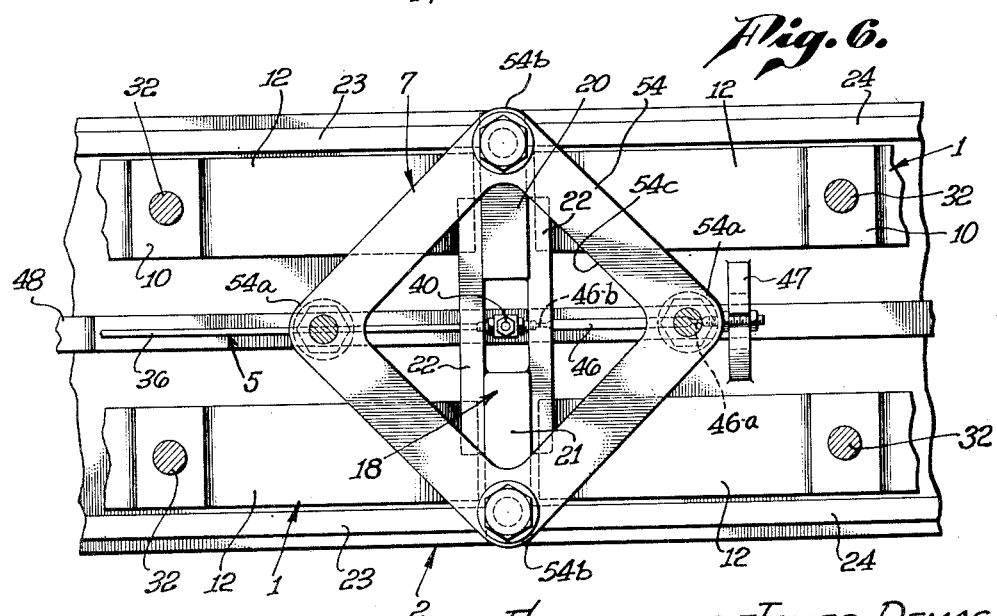

Patented Oct. 14, 1952

2,613,927

UNITED STATES PATENT OFFICE 2,613,927

WEIGHT DETERMINING APPARATUS

Epaminondas James Demas, North Hollywood, Calif., assignor to Triplett & Barton Inc., Burbank, Calif., a corporation of California Application August 23, 1945, Serial No. 612,230

7 Claims. (Cl. 265—68)

This invention relates to weight determining apparatus or scales, and particularly to such of large capacity.

It is an object of this invention to provide such apparatus which comprises a compact, self-contained and readily portable unit.

It is another object of this invention to provide such apparatus which is accurate under all conditions of loading.

It is another object of this invention to provide such apparatus which does not require consistent loading to insure an accurate determination of the load.

It is another object of this invention to provide such apparatus which is so arranged that a thrust or horizontal component in the load does not adversely affect the measurement.

It is another object of this invention to provide such apparatus having improved indicating means which may be readily calibrated to give a correct indication of the weight.

It is a still further object of this invention to provide such apparatus which is rigid of construction, but which is relatively narrow to facilitate its use in determining wheel loading, such as in connection with aircraft landing gear.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 1 is a side elevation of a weight determining apparatus incorporating the features of the invention;

Figure 2 is a top plan view of the apparatus of Figure 1;

Figure 3 is an elevation as seen from the right hand side of Figure 1;

Figures 5 and 6 are sections taken as indicated by the correspondingly numbered lines of Figure 4.

Figure 4:
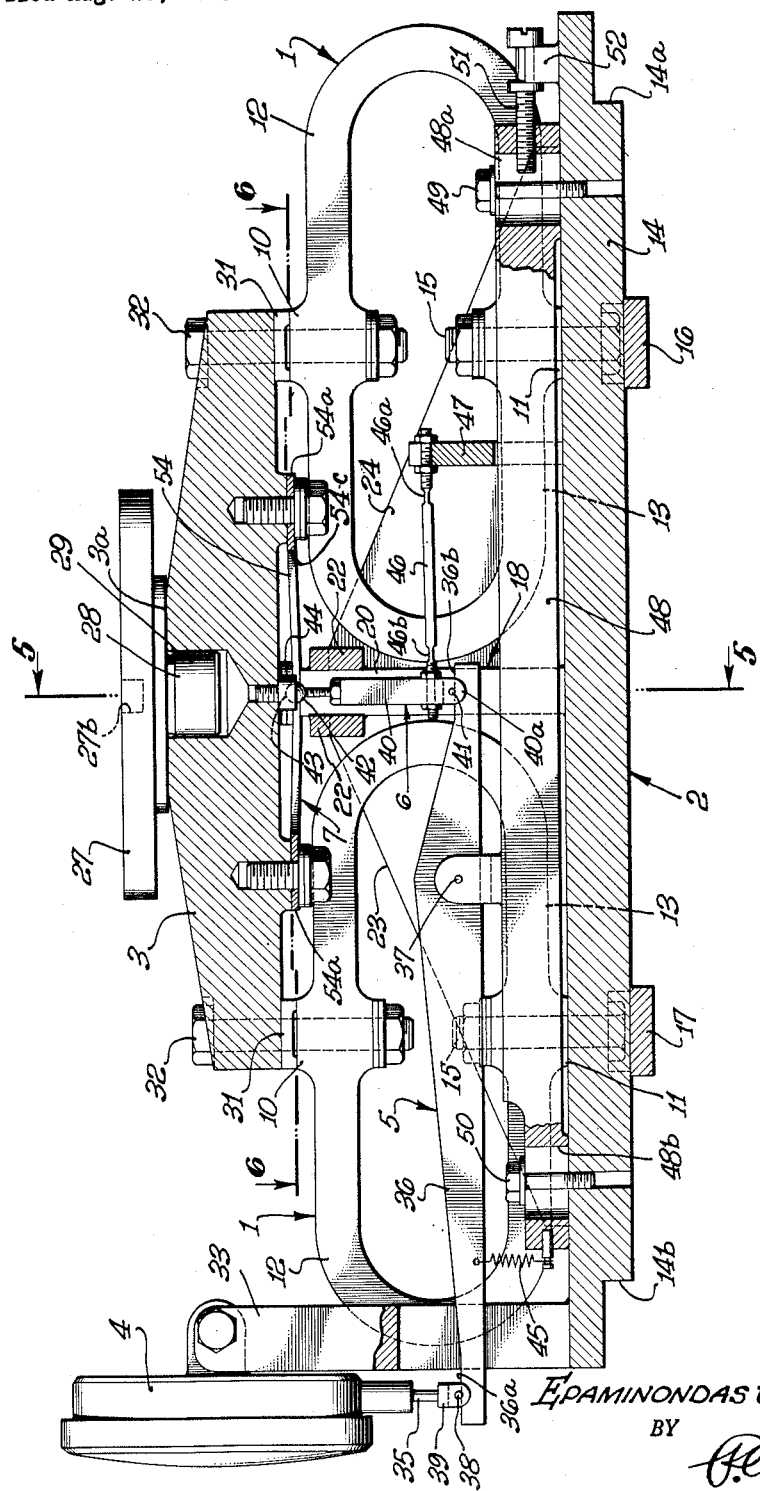
Figure 4 is a longitudinal section on an enlarged scale, taken as indicated by line 4—4 of Figure 2.

The apparatus, as clearly shown in Figures 1 and 2 of the drawings, comprises a plurality of elastic elements 1 mounted on a base 2 and arranged to support a loading plate 3 by engaging points symmetrically spaced about its center. For example, the plate 3 may be rectangular, in which case there may be provided four supporting members 1, each supporting a corner of the plate 3. The members 1 are designed to be deflected slightly by the application of loads within a desired range, the magnitude of the applied load being shown by appropriate indicating apparatus. Such apparatus may comprise electrical, optical or mechanical means actuated in accordance with the deflection of the members 1, and arranged to give an indication at a remote point if desired. In the present instance, the apparatus for measuring such deflection is shown as comprising a gauge 4 appropriately calibrated to indicate directly in desired units the load on the plate 3, and for this purpose being arranged to be operated in response to downward movement of the plate 3 by means of a lever 5, one end of which is operatively connected to the plate 3 by means 6. The connecting means 6 engages the central point of the loading plate 3, (see Figures 5 and 6) thus any eccentricity in the loading of the plate is automatically compensated for and does not affect the accuracy of the indication given by the gauge 4.

A stabilizing means is provided, connecting the plate 3 with the base 2, which is arranged to be very resistant to bending, as by the provision of several gusset plates. This means includes a web member 7 which is readily flexible in the normal direction of deflection of the elements 1 but is very rigid in the transverse direction. Thus, the horizontal component of any load applied to the plate 3 is transferred by the member 7 directly to the base 2 and does not affect the accuracy of the weight determination. At the same time the yieldability of the member 7 is such as not to affect the vertical component of the load.

Referring in more detail to the apparatus, each of the elastic elements 1 is of flattened ring like form, and supported so that the plane of the member extends in the direction in which the load is to act, the load being supported at opposite areas on the flattened portions of the member. These areas are provided by the bosses 10 and 11, so that the sides 12 and 13 of the member are free to flex in response to the load.

In the present instance there are four elastic elements 1 provided. The base 2 comprises a rectangular plate 14 upon which the elements 1 are mounted in tandem in a pair of spaced parallel planes normal to the base. For this purpose, mounting bolts 15 extend through the lower portions 13 of each element 1 respectively, and plate 14, and serve to clamp the bosses 11 of the members 1 against the upper face of the plate 14. To prevent bending stresses in the plate 14, transverse bars 16 and 17 are provided to transmit the load from each pair of members 1 to the floor or other support. The opposite ends of the plate 14 are undercut as indicated by 14—a and 14—b to provide hand grips.

The base 2 includes an extension 18 intermediate the ends of the plate 14. This extension is bifurcated to provide a space 19 to accommodate a portion of the operating mechanism for the gauge 4, to be described presently. The extension 18 is formed by a pair of spaced upright posts 20 and 21 secured to the plate 14, as by welding, and joined at their upper ends by straps 22. The posts 20 and 21 are each strongly braced by oppositely extending gusset plates 23 and 24 extending between each post and the base 14 adjacent the opposite sides thereof. These gusset plates 23 and 24 are also secured by welding.

The loading plate 3 is of flattened, rectangular pyramidal form and is truncated to provide a flat surface 3—a to support the load. The load may be conveniently applied as by means of a jack pad 27, positioned on the plate 2 by means of a boss 28 on the pad, cooperating with a suitable bore 29 formed in the plate 3. The face of the pad 27 may be grooved as at 27a in Figure 2, or otherwise arranged to prevent slippage of a load imposed thereon. Additionally, it may have a recess or threaded opening 27—b in its center for receiving a pin or threaded lug usually provided on a conventional jack cylinder (indicated by broken lines at 30 in Figure 5) with which it is contemplated that the apparatus may be used at times.

The loading plate 3 is provided with pads 31 at each corner which are adapted to rest respectively on the pads 10 of the elastic elements 1, whereby these elements 1 support the loading plate 3 on the base 2. A bolt 32 at each corner serves to secure the plate to the elastic elements respectively.

It will be apparent that by appropriate design and choice of material, the ring-like elastic elements 1 can be made to resist deflection except under large loads, and since within the elastic limits of the material such deflection is proportional to the load and exists only as long as the load is applied, the movement of plate 3 toward the base 2 is in accordance with the load on the plate. Accordingly, by providing means, as the gauge 4, for indicating such movement, the load can be readily determined.

The gauge 4 is shown as supported on the base 2 by a bracket 33 and may be of any preferred type adapted to give an indication in accordance with the movement of an operating stem 35 into and out of the gauge casing. This stem 35 is arranged to be actuated by movement of the plate 3 through the medium of a multiplying lever 36, pivotally supported at 37 on the base plate 14.

The gauge 4 it is to be understood includes means for resiliently urging the stem 35 outwardly to cause the gauge to give a zero indication, such movement causing a pin 38, carried by a clevis 39 on the stem 35, to engage a portion 36—a of the upper edge surface of the lever 36. The means 6 which operatively connects the plate 3 with the lever 5, comprises a strut member 40 provided with a pin 41 at its lower end for similarly engaging a portion 36—b at the opposite end of the upper edge surface of the lever 36. The upper end of the strut 40 adjustably carries a ball 42 adapted to engage a downwardly facing seat 43, formed in a seat member 44 threadedly secured in the plate 3.

A light tension spring 45 continually urges the lever 36 about its pivot 37 in a direction to cause the surface 36—b to approach the plate 3, whereby the strut 40 is confined between the surface 36—b and the seat 43. The strut 40 is restrained against movement transversely of the lever 36 by depending lips 40a, formed on the lower end of the strut and which engage the opposite sides of the lever 36 (see Figure 5). The strut 40 is anchored against movement longitudinally of the surface 36—b by a bar 46 adjustably secured at its opposite ends respectively to the strut 40 and a post 47 secured to the base plate 14. Since the vertical movement of the strut 40 is very slight, no pivoted connections are necessary for the bar 46, reduced portions 46—a and 46—b imparting sufficient flexibility.

The parts are so proportioned and adjusted that for zero deflection of the elastic members 1, corresponding to the unloaded position of the plate 3, the gauge 4 indicates zero and the lever surfaces 36—a and 36—b are horizontal. This permits horizontal translation of the lever 36 on the base plate 14 to vary the effective lengths of the lever arms by moving the pivot 37 in the direction in which the lever extends. For this purpose the pivotal support 37 is formed on a bar 48 guided for movement on plate 14 in a direction parallel with the lever 36 as by slots 48—a and 48—b at the opposite ends of the bar and engaged respectively by cap screws 49 and 50 threaded into the plate 14. The cap screws 49 and 50 when tight, serve to clamp the bar 48 in adjusted position; when loose they serve to guide it. To facilitate proper adjustment of the bar 48, an adjusting screw 51 is provided, which threadedly engages the bar 48 and is axially restrained by rotatably engaging a saddle 52 on the base plate 14. It will be apparent that rotation of the screw 51 will cause the bar 48 to move longitudinally on the plate 14 in accordance with the direction of rotation of the screw.

The force exerted by the load on the loading plate 3 may have components acting otherwise than in a direction parallel to the planes of the elastic supporting elements 1. Such components may prevent an accurate indication by the gauge 4 and if transmitted to the base 2 through the members 1 may seriously damage the apparatus. Accordingly, the stabilizing means 7 is provided for transmitting such components directly from the loading plate 3 to the base 2 through the extension 18. For this purpose, the extension 18 is arranged to be in close proximity with the lower face of the plate 3 (see Figure 5).

The stabilizing member 7 comprises a rectangular plate or member 54 of deformation resistant material, suitably secured at diagonally opposite corners 54—a to the under face of the loading plate 3, the other corners 54—b being secured to the posts 20 and 21 of the extension 18 (see Figure 6). The plate 54 is quite thin and has a large central opening 54—c, whereby the member 54 is sufficiently flexible to yield readily to limited movement in the direction of normal movement of the loading plate. On the other hand, the stiffness of the member 54 laterally opposes movement of the loading plate in other than a vertical direction, and thus serves to transmit any forces other than those acting in vertical direction directly to the base 2.

An important feature of the apparatus is that it is not necessary that the load be located in any particular area of the loading plate to obtain an accurate weight indication. This greatly facilitates the use of the apparatus. This result is attained by the location of the strut 40 centrally of the points of support of the plate 3. Thus, referring to Figure 4, if the load is applied for example to the left of the center of the plate 3, the supporting elements on that side of the center will be deflected to a greater extent than those on the right hand side, but the downward movement at the center of the plate 3 and of strut 40 will be the average of the deflection of the supporting elements and hence the indication will be the same as if the weight and the resultant deflection was equally divided between those elements I on the left and those on the right. Similar results of determining the average deflection prevail for any condition of eccentric loading, and thus the correctness of an indication is assured without the necessity of consistent loading.

The provision of the elastic members I makes possible the design of an apparatus which is capable of measuring large loads of the order, for example, of tens of thousands of pounds, and which at the same time is quite narrow, as clearly shown in Figures 2, 5 and 6 of the drawing. This latter feature is of some importance, as it permits the use of the apparatus in restricted space and also permits the apparatus to be used in connection with an overhanging member. This is particularly useful in determining the wheel loading of various structures, since a suitable support such as the jack 30 may engage the wheel axle quite close to the wheel 30a which may extend past one side of the apparatus, as indicated in Figure 5. This permits a much simpler procedure than would be possible if it was necessary to place the apparatus directly under the wheel, as would be the case with a wider scale.

I claim:

1. In weight determining apparatus, means forming a base, a loading member, means mounting said member on the base for movement toward and away therefrom including a plurality of elastic ring-like elements disposed in planes normal to said base, said elements being adapted to yield in response to the loading of said member, and means insuring that the force exerted by the load acts in the planes of said elements, comprising a thin ring-like member extending transversely of said planes and connecting the loading member to the base.

2. In weight determining apparatus, a rectangular base, a loading member, pairs of elastic ring-like elements disposed in spaced parallel planes mounting said member on the base, and adapted to deflect under load, means forming a rigid extension on the base intermediate the elements of each pair and adjacent said member, oppositely directed force transmitted means adapted to yield readily in a direction normal to said base connecting said member with said extension to transmit components of the force exerted by the load acting in directions other than parallel with said planes directly from the loading member to the base, and means for indicating the load.

3. In portable apparatus for determining weights of large magnitude: means forming a base; a loading member; means mounting said member on the base, comprising a plurality of unitary elastic elements of circumferentially complete ring like form adapted to deflect in accordance with the load on said member, said elements being vertically disposed in pairs, respectively adjacent to and parallel with the longitudinal edges of the base; means forming a wall on said base extending transversely between the elements of each pair; and means connecting said member to said wall to restrict lateral movement only of said member.

4. In portable apparatus for determining weights of large magnitude: means forming a base; a loading member; means mounting said member on the base, comprising a plurality of unitary elastic elements of circumferentially complete ring like form adapted to deflect in accordance with the load on said member, said elements being vertically disposed in pairs, respectively adjacent to and parallel with the longitudinal edges of the base; means forming a wall on said base extending transversely between the elements of each pair; and means connecting points on said member spaced on opposite sides of said wall with transversely spaced points on said wall, said means being readily yieldable in the direction of deflection of said elements but resistant to yielding in a direction transverse thereto.

5. In portable apparatus for determining weights of large magnitude: means forming a relatively narrow, elongated base; a loading member; means mounting said member on the base, comprising a plurality of unitary elastic elements of circumferentially complete ring-like form adapted to deflect in accordance with the load on said member, said elements being vertically disposed in pairs, respectively adjacent to and parallel with the longitudinal edges of the base; means connected with said member for restricting lateral movement of said member but permitting unrestricted movement thereof in element deflecting direction; and means for indicating the deflection of said elements comprising an elongated member extending longitudinally between said pairs of elements.

6. In portable apparatus for determining weights of large magnitude: means forming a base; a loading member; means mounting said member on the base, comprising a plurality of unitary elastic elements of circumferentially complete ring like form adapted to deflect in accordance with the load on said member, said elements being vertically disposed in pairs, respectively adjacent to and parallel with the longitudinal edges of the base; and means connecting said member to said base intermediate the elements of each pair to restrict lateral movement only of said member.

7. In portable apparatus for determining weights of large magnitude: means forming a base; a loading member; means mounting said member on the base, comprising a plurality of unitary elastic elements of circumferentially complete ring like form adapted to deflect in accordance with the load on said member, said elements being vertically disposed in pairs, respectively adjacent the longitudinal edges of the base; means forming a wall on said base extending transversely between the elements of each pair; and means connecting said member to said wall to restrict lateral movement only of said member.

EPAMINONDAS JAMES DEMAS.

(References on following page)

REFERENCES CITED

The following references are of record in the file of this patent:

UNITED STATES PATENTS

| Number | Name | Date |
|---|---|---|
| 193,414 | Lintz | July 24, 1877 |
| 396,285 | McNeill | Jan. 15, 1889 |
| 566,698 | Raab | Aug. 25, 1896 |
| 667,835 | Weiss | Feb. 12, 1901 |
| 1,928,065 | Litle | Sept. 26, 1933 |
| 2,190,506 | Wurr | Feb. 13, 1940 |
| 2,344,684 | Eisner | Mar. 21, 1944 |

FOREIGN PATENTS

| Number | Country | Date |
|---|---|---|
| 6,586 | Great Britain | May 30, 1885 |